(12) United States Patent
Silverstein

(10) Patent No.: US 9,088,842 B2
(45) Date of Patent: Jul. 21, 2015

(54) GRILLE FOR ELECTROACOUSTIC TRANSDUCER

(71) Applicant: Bose Corporation, Framingham, MA (US)

(72) Inventor: Steven A. Silverstein, Marlborough, MA (US)

(73) Assignee: Bose Corporation, Framingham, MA (US)

( * ) Notice: Subject to any disclaimer, the term of this patent is extended or adjusted under 35 U.S.C. 154(b) by 36 days.

(21) Appl. No.: 13/799,703

(22) Filed: Mar. 13, 2013

(65) Prior Publication Data

US 2014/0270322 A1 Sep. 18, 2014

(51) Int. Cl.

| H04R 1/02 | (2006.01) |
|---|---|
| B60N 2/48 | (2006.01) |
| B60N 2/58 | (2006.01) |
| B60N 2/42 | (2006.01) |
| B60N 2/427 | (2006.01) |
| H04R 5/02 | (2006.01) |

(52) U.S. Cl.
CPC .............. *H04R 1/023* (2013.01); *B60N 2/4214* (2013.01); *B60N 2/42709* (2013.01); *B60N 2/4876* (2013.01); *B60N 2/58* (2013.01); *H04R 1/02* (2013.01); *H04R 1/025* (2013.01); *H04R 5/023* (2013.01)

(58) Field of Classification Search
CPC ........ H04R 1/023; H04R 1/035; H04R 5/023; H04R 2201/021; H04R 2499/13; B60N 2/4876
USPC ........... 381/86, 386, 389, 391, 189, 302, 182, 381/152, 365, 71.4, 332–336, 367, 368, 381/388, 300, 301; 296/37.13, 37.16; 181/150
See application file for complete search history.

(56) References Cited

U.S. PATENT DOCUMENTS

| 3,944,020 A | 3/1976 | Brown |
|---|---|---|
| 4,027,112 A | 5/1977 | Heppner et al. |
| 4,042,791 A | 8/1977 | Wiseman |
| 4,329,544 A | 5/1982 | Yamada |
| 4,490,842 A | 12/1984 | Watanabe |

(Continued)

FOREIGN PATENT DOCUMENTS

| DE | 4419079 C1 | 11/1995 |
|---|---|---|
| DE | 19513769 A1 | 10/1996 |

(Continued)

OTHER PUBLICATIONS

Morello et al., "The Automotive Body, Volume II: System Design", p. 118, Springer: New York, 2011.*

(Continued)

*Primary Examiner* — Curtis Kuntz
*Assistant Examiner* — Joshua A Kaufman
(74) *Attorney, Agent, or Firm* — Brian M. Dingman; Dingman, McInnes & McLane, LLP

(57) ABSTRACT

A grille for an electroacoustic transducer. The grille has a frame defining a length, a width, and a depth, the frame configured to cover at least a portion of the electroacoustic transducer, and the frame configured as substantially acoustically transparent relative to the electroacoustic transducer. The frame has an energy absorption capacity such that for a mass of 6.8 kg impacting the frame at a speed of 24.1 km/h, the 3 ms deceleration is no more than 80 gs.

19 Claims, 3 Drawing Sheets

(56) References Cited

U.S. PATENT DOCUMENTS

| | | |
|---|---|---|
| 4,638,884 A | 1/1987 | Lee |
| 4,694,497 A | 9/1987 | Kasai et al. |
| 4,696,370 A | 9/1987 | Tokumo et al. |
| 4,797,934 A | 1/1989 | Hufnagel |
| 4,977,600 A | 12/1990 | Ziegler |
| 5,097,821 A | 3/1992 | Eakin |
| 5,143,055 A | 9/1992 | Eakin |
| 5,193,118 A | 3/1993 | Latham-Brown et al. |
| 5,287,412 A | 2/1994 | Etzel et al. |
| 5,305,386 A | 4/1994 | Yamato |
| 5,325,435 A | 6/1994 | Date et al. |
| 5,368,359 A | 11/1994 | Eakin |
| 5,370,446 A | 12/1994 | Bancod |
| 5,387,026 A | 2/1995 | Matsuhashi |
| 5,398,992 A | 3/1995 | Daniels |
| 5,459,790 A | 10/1995 | Scofield et al. |
| 5,661,812 A | 8/1997 | Scofield et al. |
| 5,687,230 A | 11/1997 | Olausson et al. |
| 5,687,246 A | 11/1997 | Lancon |
| 5,710,818 A | 1/1998 | Yamato et al. |
| 5,748,748 A | 5/1998 | Fischer et al. |
| 5,784,473 A | 7/1998 | Ferren |
| 5,841,879 A | 11/1998 | Scofield et al. |
| 5,883,961 A | 3/1999 | House et al. |
| 5,887,071 A | 3/1999 | House |
| 5,889,875 A | 3/1999 | Caron et al. |
| 5,949,894 A | 9/1999 | Nelson et al. |
| 5,997,091 A | 12/1999 | Rech et al. |
| 6,021,208 A | 2/2000 | Kin-Lung |
| 6,089,663 A | 7/2000 | Hill |
| 6,094,496 A | 7/2000 | Stowers, Sr. |
| 6,144,747 A | 11/2000 | Scofield et al. |
| 6,217,118 B1 | 4/2001 | Heilig |
| 6,402,238 B1 | 6/2002 | Bigi et al. |
| 6,478,108 B1 | 11/2002 | Linhard et al. |
| 6,498,856 B1 | 12/2002 | Itabashi et al. |
| 6,681,024 B2 | 1/2004 | Klein et al. |
| 6,718,039 B1 | 4/2004 | Klayman et al. |
| 6,744,898 B1 | 6/2004 | Hirano |
| 6,812,900 B2 | 11/2004 | Ghabra et al. |
| 6,853,732 B2 | 2/2005 | Scofield |
| 6,904,157 B2 | 6/2005 | Shima |
| 6,965,787 B2 | 11/2005 | Kindo et al. |
| 6,975,737 B2* | 12/2005 | Hirao ............ 381/302 |
| 6,991,289 B2 | 1/2006 | House |
| 7,043,031 B2 | 5/2006 | Klayman et al. |
| 7,088,840 B2 | 8/2006 | Maekawa |
| 7,092,531 B2 | 8/2006 | Enya et al. |
| 7,130,440 B2 | 10/2006 | Maekawa et al. |
| 7,159,938 B1 | 1/2007 | Shiraishi |
| 7,162,048 B2 | 1/2007 | Shima |
| 7,268,677 B2 | 9/2007 | Enya et al. |
| 7,284,637 B2 | 10/2007 | Abe et al. |
| 7,366,607 B2 | 4/2008 | Nakaishi et al. |
| 7,367,886 B2 | 5/2008 | Loose et al. |
| 7,386,139 B2 | 6/2008 | Hashimoto et al. |
| 7,440,578 B2 | 10/2008 | Arai et al. |
| 7,508,952 B2 | 3/2009 | Hofmann et al. |
| 7,555,130 B2 | 6/2009 | Klayman et al. |
| 7,561,706 B2 | 7/2009 | Holmi et al. |
| 7,676,047 B2 | 3/2010 | Aylward et al. |
| 7,684,577 B2 | 3/2010 | Arai et al. |
| 7,688,992 B2 | 3/2010 | Aylward et al. |
| 8,019,454 B2 | 9/2011 | Haulick et al. |
| 8,031,879 B2 | 10/2011 | Eid et al. |
| 8,045,736 B2 | 10/2011 | Shibata et al. |
| 8,045,743 B2* | 10/2011 | Aylward et al. ........... 381/388 |
| 8,073,156 B2 | 12/2011 | Hutt et al. |
| 8,077,873 B2 | 12/2011 | Shridhar et al. |
| 8,090,116 B2 | 1/2012 | Holmi et al. |
| 8,103,017 B2 | 1/2012 | Nakagaki |
| 8,121,319 B2 | 2/2012 | Azizi et al. |
| 8,121,336 B2 | 2/2012 | Hutt et al. |
| 8,126,159 B2 | 2/2012 | Goose et al. |
| 8,160,267 B2 | 4/2012 | Sakamoto |
| 8,199,940 B2 | 6/2012 | Yokota |
| 8,212,659 B2 | 7/2012 | Iwamoto |
| 8,213,646 B2 | 7/2012 | Matsumoto et al. |
| 8,238,578 B2 | 8/2012 | Aylward |
| 8,315,401 B2 | 11/2012 | Hayakawa et al. |
| 8,325,936 B2 | 12/2012 | Eichfeld et al. |
| 8,325,938 B2 | 12/2012 | Yokota |
| 2001/0041245 A1* | 11/2001 | Funakoshi ............ 428/131 |
| 2002/0031234 A1 | 3/2002 | Wenger et al. |
| 2003/0081795 A1 | 5/2003 | Hirao |
| 2003/0141967 A1 | 7/2003 | Aichi et al. |
| 2004/0021350 A1 | 2/2004 | House |
| 2006/0057349 A1* | 3/2006 | Neitzke et al. ............ 428/221 |
| 2006/0222182 A1 | 10/2006 | Nakaishi et al. |
| 2006/0269068 A1 | 11/2006 | Yokota |
| 2007/0133949 A1 | 6/2007 | Tatsuta et al. |
| 2007/0195964 A1 | 8/2007 | Yokota |
| 2008/0037794 A1 | 2/2008 | Sugawara et al. |
| 2008/0045668 A1* | 2/2008 | Eibeck et al. ............ 525/398 |
| 2008/0260174 A1 | 10/2008 | Yokota |
| 2008/0273722 A1 | 11/2008 | Aylward et al. |
| 2009/0214055 A1 | 8/2009 | Sawashi |
| 2010/0148550 A1 | 6/2010 | Kidd |
| 2010/0282536 A1* | 11/2010 | Carps ............ 181/150 |
| 2010/0320819 A1 | 12/2010 | Cohen et al. |
| 2011/0235832 A1 | 9/2011 | Riopel |
| 2011/0286614 A1 | 11/2011 | Hess |
| 2012/0008806 A1 | 1/2012 | Hess |
| 2014/0355783 A1* | 12/2014 | Subat ............ 381/86 |

FOREIGN PATENT DOCUMENTS

| | | |
|---|---|---|
| EP | 0368291 A1 | 5/1990 |
| EP | 0993230 A2 | 4/2000 |
| EP | 1077156 A1 | 8/2000 |
| EP | 1083094 A1 | 3/2001 |
| EP | 1137319 A2 | 9/2001 |
| EP | 1372356 B1 | 8/2009 |
| EP | 2172058 A1 | 4/2010 |
| EP | 2179595 A1 | 4/2010 |
| FR | 2646330 A1 | 11/1990 |
| FR | 2696388 A1 | 4/1994 |
| FR | 2768099 A1 | 3/1999 |
| FR | 2768100 A1 | 3/1999 |
| FR | 2779313 A1 | 12/1999 |
| GB | 2224178 A | 10/1988 |
| JP | 5647197 A | 4/1981 |
| JP | 59174090 A | 10/1984 |
| JP | 60183900 A | 9/1985 |
| JP | 61188243 A | 8/1986 |
| JP | 6478600 A | 3/1989 |
| JP | 01136843 A | 5/1989 |
| JP | 01136844 A | 5/1989 |
| JP | 01202100 A | 8/1989 |
| JP | 0385095 A | 4/1991 |
| JP | 0385096 A | 4/1991 |
| JP | 03132198 A | 6/1991 |
| JP | 04137897 A | 5/1992 |
| JP | 04325338 A | 11/1992 |
| JP | 0479520 B2 | 12/1992 |
| JP | 05137630 A | 6/1993 |
| JP | 05191342 A | 7/1993 |
| JP | H05 262184 A | 10/1993 |
| JP | 05344584 A | 12/1993 |
| JP | 06161466 A | 6/1994 |
| JP | 0775578 B2 | 8/1995 |
| JP | 07227332 A | 8/1995 |
| JP | 07264689 A | 10/1995 |
| JP | 07281675 A | 10/1995 |
| JP | 07288885 A | 10/1995 |
| JP | 0847078 A | 2/1996 |
| JP | 08314474 A | 11/1996 |
| JP | 09252499 A | 9/1997 |
| JP | 10143166 A | 5/1998 |
| JP | 10194049 A | 7/1998 |
| JP | 11342799 A | 12/1999 |
| JP | 11355896 A | 12/1999 |
| JP | 3042731 B2 | 5/2000 |
| JP | 2000270390 A | 9/2000 |

(56) References Cited

FOREIGN PATENT DOCUMENTS

| | | | |
|---|---|---|---|
| JP | 2001095646 A | 4/2001 |
| JP | 3232521 B2 | 11/2001 |
| JP | 3238965 B2 | 12/2001 |
| JP | 3256560 B2 | 2/2002 |
| JP | 2002191469 A | 7/2002 |
| JP | 2004016522 A | 1/2004 |
| JP | 2004016711 A | 1/2004 |
| JP | 2004191871 A | 7/2004 |
| JP | 2004226189 A | 8/2004 |
| JP | 2005027019 A | 1/2005 |
| JP | 2005150954 A | 6/2005 |
| JP | 2005159914 A | 6/2005 |
| JP | 2005167378 A | 6/2005 |
| JP | 2005167379 A | 6/2005 |
| JP | 3709136 B2 | 10/2005 |
| JP | 2006080886 A | 3/2006 |
| JP | 3790042 B2 | 6/2006 |
| JP | 2006222686 A | 8/2006 |
| JP | 3831984 B2 | 10/2006 |
| JP | 2006270302 A | 10/2006 |
| JP | 2006273164 A | 10/2006 |
| JP | 2006279864 A | 10/2006 |
| JP | 4756327 A | 1/2007 |
| JP | 2007003994 A | 1/2007 |
| JP | 2007053622 A | 3/2007 |
| JP | 4029776 B2 | 1/2008 |
| JP | 2008252686-1 | 10/2008 |
| JP | 2009017094 A | 1/2009 |
| JP | 2009018600 A | 1/2009 |
| JP | 4338028 B2 | 9/2009 |
| JP | 4487627 B2 | 6/2010 |
| JP | 4692803 B2 | 6/2011 |
| JP | 4735920 B2 | 7/2011 |
| JP | 4778272 B2 | 9/2011 |
| JP | 5042664 B2 | 10/2012 |
| WO | WO-93/01951 A1 | 2/1993 |
| WO | WO-94/15815 A1 | 7/1994 |
| WO | WO-2004/056607 A1 | 7/2004 |
| WO | WO-2009/012500 A2 | 1/2009 |
| WO | WO-2009-012501 A2 | 1/2009 |
| WO | WO-2009/113319 A1 | 9/2009 |
| WO | WO-2012/013743 A1 | 2/2012 |

OTHER PUBLICATIONS

Translation of JP H05-262184, Takada, Oct. 1993, classified in B60R 11/02.*
Brian M. Boggess et al: "Boggess, 1 Mass-Based Considerations for Head Injury Protection Development", Proceedings of the 20th International Technical Conference on the Enhanced Safety of Vehicles (ESV), Jun. 21, 2007, XP055120707, Lyon, France. Retrieved from the Internet: URL:http://www-nrd.nhtsa.dot.gov/pdf/esv/esv20/07-0154-W.pdf [retrieved on May 28, 2014].
International Search Report and Written Opinion of the International Searching Authority issued in corresponding PCT Application No. PCT/US2014/019450, dated Jun. 6, 2014.

* cited by examiner

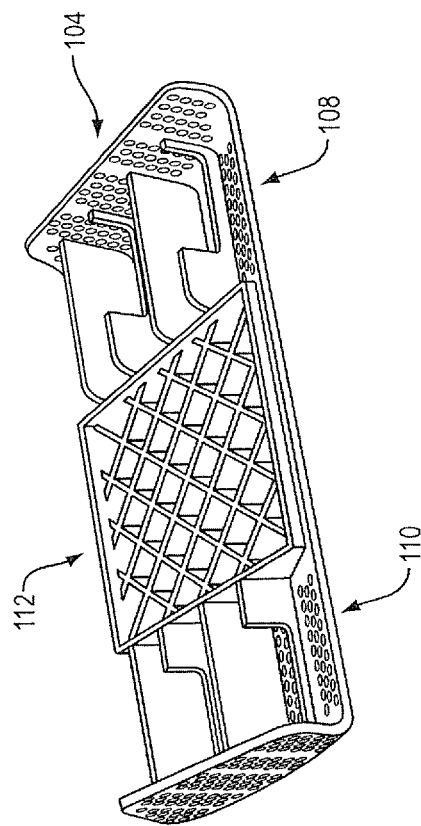
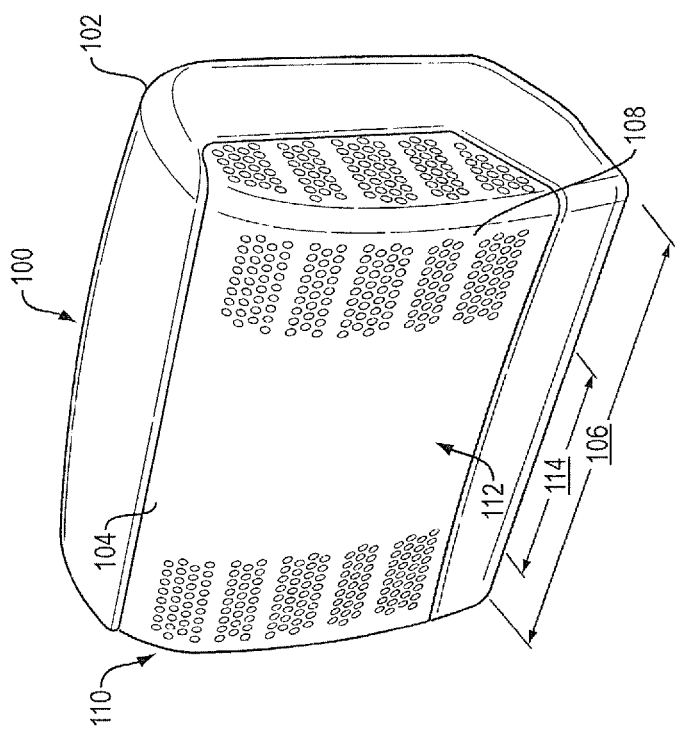
FIG. 4
FIG. 3

GRILLE FOR ELECTROACOUSTIC TRANSDUCER

BACKGROUND

This disclosure relates to a grille for an electroacoustic transducer. In conventional automobiles, manufacturers mount electroacoustic transducers in a variety of locations. For example, manufacturers typically mount electroacoustic transducers on a rear deck portion of the automobile and on the front and/or rear doors of the vehicle. Alternately, manufacturers, mount the electroacoustic transducers to the seat or headrest of the vehicle. In this configuration, the electroacoustic transducers are disposed in proximity to a passenger's ears which allows the passenger to hear music provided by the automobile's associated audio device at a comfortable sound intensity.

For example, U.S. Patent Application Publication 2010/0148550 relates to an audio headrest that attaches to a seat back of a seat assembly in a vehicle. The audio headrest is removably attached to the seat back of the seat assembly and supports a user's head when the user is seated on the seat while supplying audio to the user. The audio headrest includes at least one speaker, a receiver, and an attachment mechanism to attach to the seat back of the seat assembly. The speaker projects audio to the user. The receiver receives a signal from a source, such as a DVD player, a radio, etc. The attachment mechanism attaches the audio headrest to the seat back.

SUMMARY

With certain conventional automobiles, manufacturers typically mount speakers (i.e., electroacoustic transducers and rigid, protective grille covers) to each headrest in the vehicle with each transducer being disposed in proximity to each of the passenger's ears, such as provided in U.S. Patent Application Publication 2010/0148550. To optimize audio performance of the transducers, a manufacturer ideally designs the headrest hold the distance between the two speakers within a relatively narrow range. However, to minimize injury to passengers, automotive safety regulations require that rigid surfaces cannot be disposed within a 140 mm central area of the headrest. Accordingly, in conventional headrests, manufacturers mount the speakers to the headrest at a greater than 140 mm offset from each other, which can affect audio performance.

In one aspect, a grille for an electroacoustic transducer includes a frame defining a length, a width, and a depth, the frame configured to cover at least a portion of the electroacoustic transducer, and the frame configured as substantially acoustically transparent relative to the electroacoustic transducer, with the frame having an energy absorption capacity such that for a mass of 6.8 kg impacting the frame at a speed of 24.1 km/h, the 3 ms deceleration is no more than 80 gs.

Embodiments may include one of the following features, or any combination thereof. The frame may include a material having a durometer of between about Shore A 50 and Shore A 90. The frame can be made at least in part of a thermoplastic elastomer material. The frame may have a wall thickness of between about 1.0 millimeters and 3.5 millimeters. The frame may define an open area of between about 30% and 50%. The frame may have a first wall and a second wall disposed substantially perpendicular to the first wall, the first wall and the second wall defining the open area of between about 30% and 50%.

Further embodiments may include one of the following features, or any combination thereof. The frame may be made from a first material configured as a core of the grille, the first material having a first durometer value, and a second material disposed about the outer surface of the first material, the second material having a second durometer value, the second durometer value being less than the first durometer value. The frame may have a first wall, a second wall disposed substantially perpendicular to the first wall, and a set of ribs extending between the first wall and the second wall. The frame may have a first frame portion defining a length, a width, and a depth, the first frame portion configured to cover at least a portion of a first electroacoustic transducer, and the first frame portion configured as substantially acoustically transparent relative to the first electroacoustic transducer, a second frame portion defining a length, a width, and a depth, the second frame portion configured to cover at least a portion of a second electroacoustic transducer, and the second frame portion configured as substantially acoustically transparent relative to the second electroacoustic transducer, and a third frame portion between the first frame portion and the second frame portion, the third frame portion configured to extend along at least a portion of a length of a headrest. The third frame portion may be configured to extend a distance between 140 mm and 170 mm along the length of the headrest.

In another aspect, an automobile headrest system includes a headrest having a frame, a reaction plate coupled to the frame, a cushion material disposed about the frame and reaction plate, a first electroacoustic transducer disposed at a first end of the headrest, and a second electroacoustic transducer disposed at a second end of the headrest, where the first end opposes the second end. There is a first grille disposed in proximity to the first electroacoustic transducer, and a second grille disposed in proximity to the second electroacoustic transducer. Each of the first grille and the second grille comprises a frame defining a length, a width, and a depth, the frame configured as substantially acoustically transparent relative to the electroacoustic transducer, the frame having an energy absorption capacity such that for a mass of 6.8 kg impacting the frame at a speed of 24.1 km/h, the 3 ms deceleration is no more than 80 gs.

Embodiments may include one of the following features, or any combination thereof. The frame comprises a material having a durometer of between about Shore A 50 and Shore A 90. The frame can be made at least in part of a thermoplastic elastomer material. The frame may have a wall thickness of between about 1.0 millimeters and 3.5 millimeters. The frame may define an open area of between about 30% and 50%. The frame may have a first wall and a second wall disposed substantially perpendicular to the first wall, the first wall and the second wall defining the open area of between about 30% and 50%.

Further embodiments may include one of the following features, or any combination thereof. The frame may be made from a first material configured as a core of the grille, the first material having a first durometer value, and a second material disposed about the outer surface of the first material, the second material having a second durometer value, the second durometer value being less than the first durometer value. The frame may have a first wall, a second wall disposed substantially perpendicular to the first wall, and a set of ribs extending between the first wall and the second wall. The frame may have a first frame portion defining a length, a width, and a depth, the first frame portion configured to cover at least a portion of a first electroacoustic transducer, and the first frame portion configured as substantially acoustically transparent relative to the first electroacoustic transducer, a second frame portion defining a length, a width, and a depth, the second frame portion configured to cover at least a portion of a second electroacoustic transducer, and the second frame portion configured as substantially acoustically transparent relative to the second electroacoustic transducer, and a third frame portion between the first frame portion and the second frame portion, the third frame portion configured to extend along at least a portion of a length of a headrest. The third frame portion may be configured to extend a distance between 140 mm and 170 mm along the length of the headrest. The cushion material may make up the third frame portion.

In yet another aspect the automobile headrest system includes a headrest having a frame, a reaction plate coupled to the frame, a cushion material disposed about the frame and reaction plate, a first electroacoustic transducer disposed at a first end of the headrest, and a second electroacoustic transducer disposed at a second end of the headrest, the first end opposing the second end. There is a grille disposed in proximity to the first electroacoustic transducer and the second electroacoustic transducer, the grille comprising a frame defining a length, a width, and a depth, the frame configured as substantially acoustically transparent relative to the electroacoustic transducer, the frame having an energy absorption capacity such that for a mass of 6.8 kg impacting the frame at a speed of 24.1 km/h, the 3 ms deceleration is no more than 80 gs.

All examples and features mentioned can be combined in any technically possible way.

BRIEF DESCRIPTION OF THE DRAWINGS

The foregoing and other objects, features and advantages will be apparent from the following description of particular embodiments of the innovation, as illustrated in the accompanying drawings in which like reference characters refer to the same parts throughout the different views. The drawings are not necessarily to scale, emphasis instead being placed upon illustrating the principles of various embodiments of the innovation.

FIG. 3 illustrates a headrest and grille for a set of electroacoustic transducers of the automobile headrest system of FIG. 1, according to one arrangement.

FIG. 4 illustrates a rear perspective view of the grille of FIG. 3, according to one arrangement.

DETAILED DESCRIPTION

To allow a manufacturer to minimize the distance between the electroacoustic transducers, arrangements of the innovation relate to a substantially flexible grille for an electroacoustic transducer. In one arrangement, the grille is manufactured from a material that substantially simulates the foam headrest material and provides a degree of rigidity to the fabric covering over the headrest. Accordingly, with the grille being manufactured from a relatively flexible material, the manufacturer can mount the electroacoustic transducers at a relatively close distance (e.g., within a 140 mm central area) while both adequately supporting the perforated or acoustically transparent headrest covering material and complying with automotive safety regulations.

Figure 1:
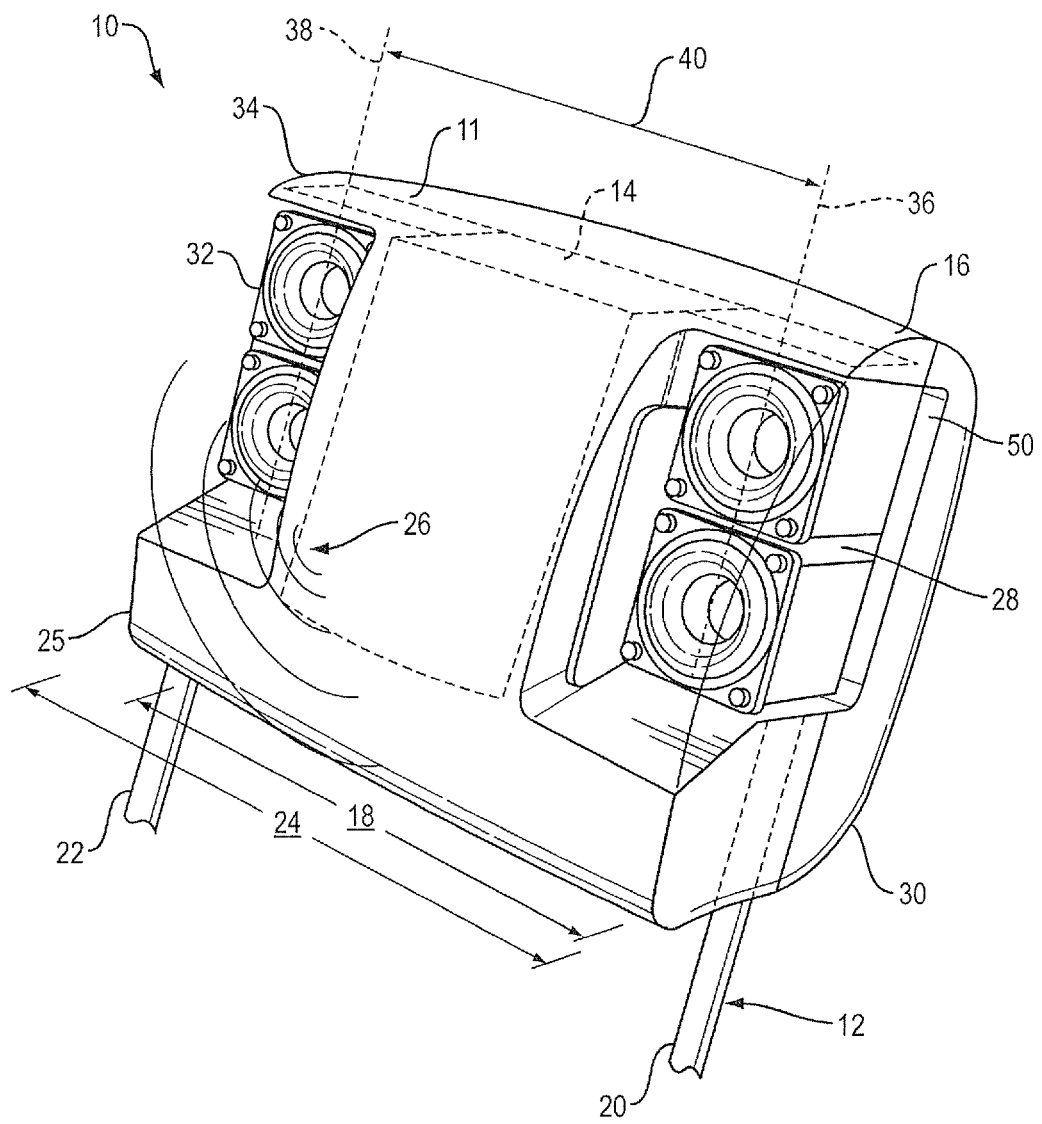
FIG. 1 illustrates an automobile headrest system, according to one arrangement.

FIG. 1 illustrates an automobile headrest system 10, according to one arrangement, that includes a headrest 11 having a frame 12, a reaction plate 14 coupled to the frame 12, and a cushion material 16 disposed about at least a portion of the frame 12 and reaction plate 14. In one arrangement, the headrest system 10 defines a cushion length 18 of between about 140 mm and 170 mm to support a user's head during use and to comply with automotive safety regulations. It should be noted that the overall length 24 of the headrest system 10 can be greater than the cushion length 18.

The frame 12 is configured to couple the headrest system 10 to an automobile seat (not shown). For example, the frame 12 includes first and second frame elements 20, 22 configured to insert within, and secure to, openings in the back of the automobile seat.

The reaction plate 14 is configured to support a user's head and minimize hyper rotation of the user's head and neck (e.g., whiplash) in the event of relatively sudden automobile acceleration, for example as might occur in the in case of a rear-end collision. In one arrangement, the reaction plate 14 is manufactured from a stamped steel plate and is secured to the frame 12 using a variety of fastening techniques.

The cushion material 16 covers at least a portion of the frame 12 and the reaction plate 14 and is configured to support and absorb the energy generated by a user's head as might occur in a rear-end collision. For example, the cushion material 16 can have an energy absorption that meets automotive head restraint safety requirements; in one case safety requirements dictate that for a spherical mass of 6.8 kg travelling at 24.1 km/h, the 3 ms deceleration must not exceed 80 gs. While the cushion material 16 can be selected from a variety of materials, in one arrangement, the cushion material 16 is a foam rubber material.

The headrest system 10 also includes electroacoustic transducers disposed within the headrest 11 at a distance from a head support surface 25 of the headrest 11 (i.e., such that the leading faces of the electroacoustic transducers are disposed at a location distal to the reaction plate 14) and which are configured to provide an acoustic audio signal 26 to a user. For example, the headrest system 10 can include a first set of electroacoustic transducers 28 disposed at a first end 30 of the headrest 11 and a second set of electroacoustic transducers 32 disposed at a second end 34 of the headrest 11. While the first and second sets of electroacoustic transducers 28, 32 can be disposed at a variety of distances from each other, in one arrangement, the centerlines 36, 38 of the respective first and second sets of transducers 28, 32 are disposed at a distance 40 of between about 100 and 160 mm from each other. In one non-limiting example distance 40 is about 130 mm. With such spacing, the first and second sets of transducers 28, 32 are disposed at a distance 40 that can be less than 140 mm, to maximize audio performance.

Figure 2:
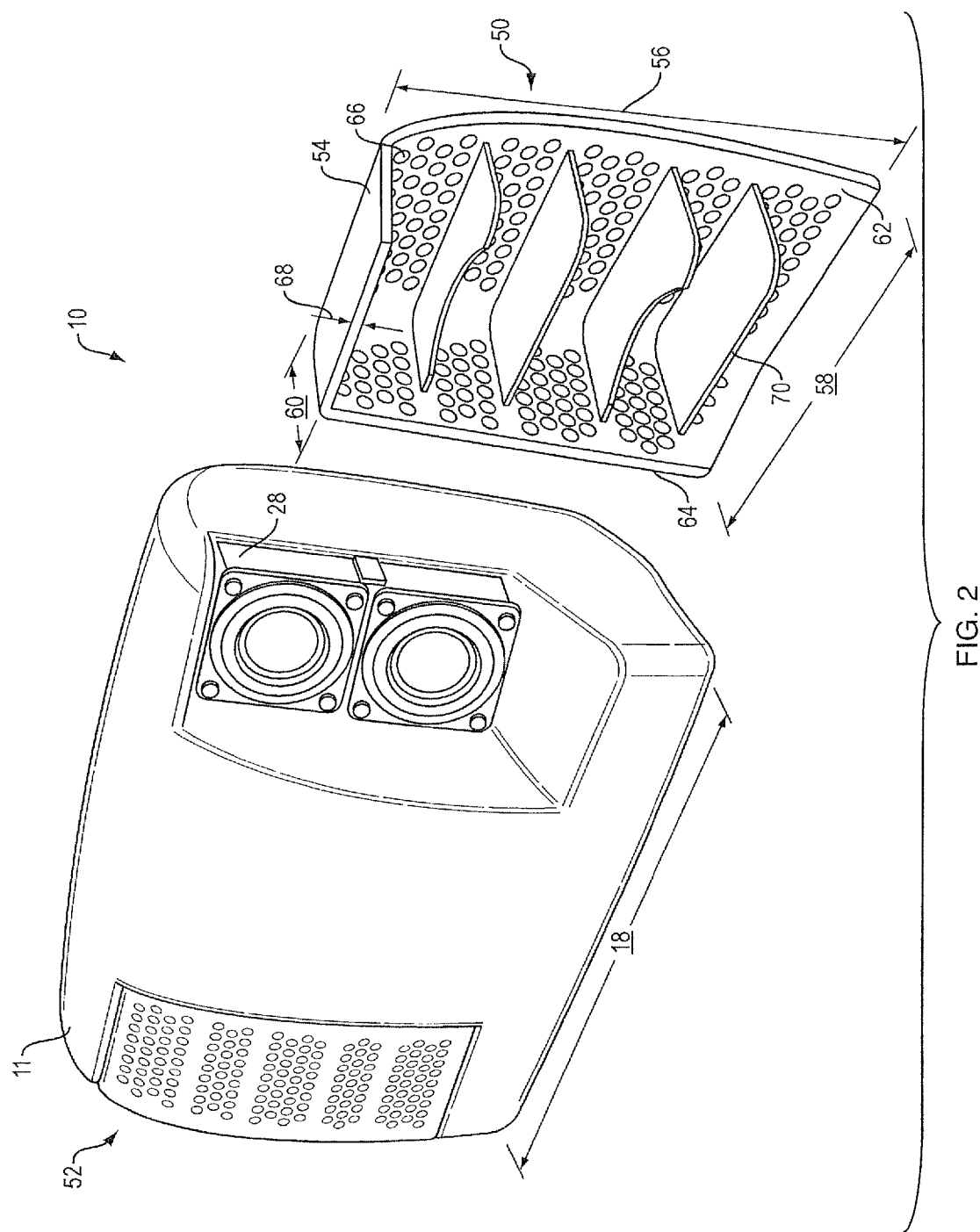
FIG. 2 illustrates a headrest and grille for an electroacoustic transducer of the automobile headrest system of FIG. 1, according to one arrangement.

With additional reference to FIG. 2, the headrest system 10 further includes one or more grilles. For example, the headrest system 10 includes a first grille 50 disposed in proximity to the first set of electroacoustic transducers 28 and a second grille 52 disposed in proximity to the second set of electroacoustic transducers 32. The first and second grilles 50, 52 can be installed relative to the headrest 11 in a variety of ways. For example, a manufacturer can attach the first grille 50 to the first end 30 of the headrest 11 and the second grille 52 to the second end 34 of the headrest 11, such as by using an adhesive, and can then cover the head rest 11 and grilles 50, 52 with a leather, cloth or fabric covering (not shown). In another example, a manufacturer can bond the first and second grilles 50, 52 to a leather, cloth or fabric covering prior to disposing the grille and covering assembly about the headrest 11.

Each grille 50, 52 is configured to protect its corresponding set of electroacoustic transducers 28, 32. Taking the first grille 50 as an example, the grille 50, in one arrangement, includes a frame 54 defining a length 56, a width 58, and a depth 60 and having a first wall 62 and a second wall 64 disposed substantially perpendicular to the first wall 62. With such a configuration, the grille 50 is configured to surround and protect the set of electroacoustic transducers 28 and to limit the ability of a user to directly contact and potentially damage the transducers 28.

The frame 54 is also configured as being substantially acoustically transparent relative to the set of electroacoustic transducers 28. With such a configuration, the frame 54 allows acoustic audio signals 26 to travel from the set of electroacoustic transducers 28 to the user with minimal, if any, attenuation. For example, each of the first and second walls 62, 64 define a set of openings 66 which provides the grille 50 with a particular open area.

Additionally, because the first wall 62 of the frame 54 extends into the cushion length 18 of the headrest system 10, in order to comply with conventional automotive safety regulations, the grille 50 is manufactured to have an energy absorption characteristic that is substantially equal to the energy absorption characteristic of the cushion material 16. For example, the grille 50 is configured with an energy-absorption characteristic at least as good as the foam materials used in automotive headrests, e.g., meeting the 80 gs standard described above. With the energy absorption of the cushion material 16 and grilles 50, 52 being substantially equal, in the event of an automobile accident (e.g., a rear-end collision), as a user's head rotates into the headrest system 10, the head compresses both the headrest 11 and the grilles 50, 52. Such compression allows the reaction plate 14 to absorb a majority of the force generated by the head in the case of a collision.

Accordingly, with the energy absorption of the grilles 50, 52 being substantially equal to that of the cushion material 16, the grilles 50, 52 protect the sets of electroacoustic transducers 28, 32 while maintaining a degree of flexibility. With such flexibility, the grilles 50, 52 can extend into the 140 mm cushion area 18 of the headrest 11 while complying with conventionally required automotive regulations. In turn, such grille positioning allows the sets of electroacoustic transducers 28, 32 to be disposed within the 140 mm central area of the headrest 11, thereby improving audio performance relative to conventional headrest systems.

As indicated above, the grilles 50, 52 can be configured with at least the energy absorption required to meet automotive head restraint safety requirements, such as the safety requirement that dictates that for a spherical mass of 6.8 kg travelling at 24.1 km/h, the 3 ms deceleration must not exceed 80 gs. A variety of factors can influence the energy absorption of the grilles. For example, factors such as the material properties and structure of the grilles 50, 52 can contribute to the energy absorption of the grilles 50, 52.

In one arrangement, taking grille 50 as an example, the frame 54 is manufactured from a compliant material, such as a thermoplastic elastomer (TPE) material. TPE materials are rubber-like materials that can be molded to a variety of durometers, such as durometers of between about Shore A 50 and Shore A 90, and that exhibit both rubber-like, as well as plastic-like, qualities. Additionally, the frame 54 can be manufactured from a variety of other materials having a durometer of between about Shore A 50 and Shore A 90, or having greater or lesser hardness, provided that the energy absorption of the structure is within the required range. The grille preferably has a thickness of from about 1.0 to about 3.5 mm.

In one arrangement, the grille 50 is manufactured from multiple materials, such as in a two-shot molding process. For example, the grille 50 can include a first material configured as a core of the grille, the first material defining a first durometer value and a first stiffness sufficient to provide the support required of the grille. The grille 50 can also include a second material disposed about the outer surface of the first material, the second material defining a second durometer value, the second durometer value being less than the first durometer value. With such a configuration, the grille 50 includes a relatively rigid core to protect the set of electroacoustic transducers 28 and a relatively compliant coating configured to compress in response to loading. The increased compliance of the outer coating when combined with the compliance of the more-rigid core results in an energy absorption within the desired range.

Additionally, the structural properties of the grilles 50, 52 can influence the energy absorption characteristic. For example, as indicated above, the grilles 50, 52 each define a given open area. In one arrangement, taking grille 50 as an example, the frame 54 defines an open area of between about 30% and 50%. With such an open area, the frame 54 minimally attenuates the acoustic audio signals 26 provided by the corresponding electroacoustic transducers 28 while maintaining flexibility of the grille 50 under loading conditions.

In one arrangement, the wall thickness 68 of the frame 54 can influence the energy absorption characteristic. For example, with a wall thickness 68 of between about 1.0 millimeters and 3.5 millimeters, the frame 54 maintains the structural integrity of the grille 50 to protect the electroacoustic transducers 28 and retains flexibility under loading conditions.

In one arrangement, additional structural components of the frame 54 can influence the energy absorption characteristic. For example, with continued reference to FIG. 2, the grille 50 includes a set of ribs 70 extending between the first wall 62 and the second wall 64. In one arrangement, the set of ribs 70 are formed from the same material as the frame 54, such as via a molding process. The set of ribs 70 are configured to maintain the structural integrity of the grille 50 to protect the electroacoustic transducers 28 and retains flexibility under loading conditions.

As indicated in FIG. 2, the headrest system 10 includes individual grilles 50, 52 for each set of electroacoustic transducers 28, 34. Such indication is by way of example, only. In one arrangement, as illustrated in FIGS. 3 and 4, a headrest system 100 includes a single grille 104 configured to couple to the headrest 102, cover both sets of electroacoustic transducers, and extend along a length 106 of the headrest 102. For example, the grille 104 includes a first frame portion 108 configured to cover at least a portion of a first electroacoustic transducer. The first frame portion 108 defines an open area and is configured as substantially acoustically transparent relative to the first electroacoustic transducer. The grille 104 includes a second frame portion 110 configured to cover at least a portion of a second electroacoustic transducer. The second frame portion 110 also defines an open area and is configured as substantially acoustically transparent relative to the second electroacoustic transducer. The grille 104 includes a third frame portion 112 between the first frame portion 108 and the second frame portion 110. The third frame portion 112 is configured to extend along a length 114 of the headrest 102, such as along a distance 114 of between 140 mm and 170 mm.

The grille 104 is configured with the stated energy absorption. With such energy absorption, the frame portions 108, 110, 112 can extend into the 140 mm cushion area 114 of the headrest 102 while complying with conventionally required automotive regulations. In turn, the grille 104 allows the sets of electroacoustic transducers 28, 32 to be disposed within the 140 mm central area 114 of the headrest 102, thereby improving audio performance relative to conventional headrest systems.

A number of implementations have been described. Nevertheless, it will be understood that additional modifications may be made without departing from the scope of the inventive concepts described herein, and, accordingly, other embodiments are within the scope of the following claims.

What is claimed is:

1. A grille for an electroacoustic transducer that is set in a recess in a headrest, comprising:
    a frame configured to cover the recess and comprising a first wall, and a second wall disposed substantially perpendicularly to the first wall, the first and second walls each having a front surface, and a rear surface that is exposed to the recess, and a plurality of spaced ribs that are coupled to the rear surfaces of both the first wall and the second wall, where the frame is substantially acoustically transparent relative to the electroacoustic transducer, and
    the frame being a unitary molded member that has an energy absorption capacity such that for a mass of 6.8 kg impacting the frame at a speed of 24.1 km/h, the 3 ms deceleration is no more than 80 gs.

2. The grille of claim 1, wherein the frame comprises a material having a durometer of between about Shore A 50 and Shore A 90.

3. The grille of claim 1, wherein the frame comprises a thermoplastic elastomer material.

4. The grille of claim 1, wherein the frame comprises a wall thickness of between about 1.0 millimeters and about 3.5 millimeters.

5. The grille of claim 1, wherein the frame defines an open area of between about 30% and 50%.

6. The grille of claim 5, wherein the first wall and the second wall define the open area of between about 30% and 50%.

7. The grille of claim 1, wherein the frame comprises:
    a first material configured as a core of the grille, the first material having a first durometer value; and
    a second material disposed about the outer surface of the first material, the second material having a second durometer value, the second durometer value being less than the first durometer value;
    wherein the frame is made by a two-shot molding process such that the two materials are unitary.

8. The grille of claim 1, wherein the frame comprises:
    a first frame portion defining a length, a width, and a depth, the first frame portion configured to cover at least a portion of a first electroacoustic transducer that is set in a recess in the headrest, and the first frame portion configured as substantially acoustically transparent relative to the first electroacoustic transducer;
    a second frame portion defining a length, a width, and a depth, the second frame portion configured to cover at least a portion of a second electroacoustic transducer that is set in a recess in the headrest, and the second frame portion configured as substantially acoustically transparent relative to the second electroacoustic transducer; and
    a third frame portion between the first frame portion and the second frame portion, the third frame portion configured to extend along at least a portion of a length of a headrest;
    wherein the ribs are also coupled to the third frame portion.

9. The grille of claim 8, wherein the third frame portion is configured to extend a distance between 140 mm and 170 mm along the length of the headrest.

10. An automobile headrest system, comprising:
    a) a headrest having:
        a headrest frame,
        a reaction plate coupled to the frame,
        a cushion material disposed about the frame and reaction plate,
        a first electroacoustic transducer disposed in a first recess at a first end of the headrest,
        a second electroacoustic transducer disposed in a second recess at a second end of the headrest, the first end opposing the second end;
    b) a first grille disposed in proximity to the first electroacoustic transducer; and
    c) a second grille disposed in proximity to the second electroacoustic transducer;
    wherein each of the first grille and the second grille comprises a grille frame configured to cover one recess and comprising a first wall, and a second wall disposed substantially perpendicularly to the first wall, the first and second walls each having a front surface, and a rear surface that is exposed to the recess, and a plurality of spaced ribs that are coupled to the rear surfaces of both the first wall and the second wall, where the frame is substantially acoustically transparent relative to the electroacoustic transducer, the frame being a unitary molded member that has an energy absorption capacity such that for a mass of 6.8 kg impacting the frame at a speed of 24.1 km/h, the 3 ms deceleration is no more than 80 gs.

11. The automobile headrest system of claim 10, wherein at least one of the grille frames comprises a material having a durometer of between about Shore A 50 and Shore A 90.

12. The automobile headrest system of claim 10, wherein at least one of the grille frames comprises a thermoplastic elastomer material.

13. The automobile headrest system of claim 10, wherein at least one of the grille frames comprises a wall thickness of between about 1.0 millimeters and about 3.5 millimeters.

14. The automobile headrest system of claim 10, wherein at least one of the grille frames defines an open area of between about 30% and 50%.

15. The automobile headrest system of claim 10, wherein at least one of the grille frames comprises:
    a first material configured as a core of the grille, the first material having a first durometer value; and
    a second material disposed about the outer surface of the first material, the second material having a second durometer value, the second durometer value being less than the first durometer value.

16. The automobile headrest system of claim 10, wherein the grille frame comprises:
    a first frame portion defining a length, a width, and a depth, the first frame portion configured to cover at the first recess, and the first frame portion configured as substantially acoustically transparent relative to the first electroacoustic transducer;
    a second frame portion defining a length, a width, and a depth, the second frame portion configured to cover at the second recess, and the second frame portion configured as substantially acoustically transparent relative to the second electroacoustic transducer; and a third frame portion between the first frame portion and the second frame portion, the third frame portion configured to extend along at least a portion of a length of a headrest;

wherein the ribs are also coupled to the third frame portion.

17. The automobile headrest system of claim 16, wherein the third frame portion is configured to extend a distance of between about 140 mm and 170 mm along the length of the headrest.

18. The automobile headrest system of claim 16, wherein the cushion material comprises the third frame portion.

19. An automobile headrest system, comprising:
a) a headrest having:
   a headrest frame,
   a reaction plate coupled to the frame,
   a cushion material disposed about the frame and reaction plate,
   a first electroacoustic transducer disposed in a recess at a first end of the headrest,
   a second electroacoustic transducer disposed in a recess at a second end of the headrest, the first end opposing the second end; and
b) a grille disposed in proximity to the first electroacoustic transducer and the second electroacoustic transducer, the grille comprising a grille frame configured to cover at least part of a recess and comprising a first wall, and a second wall disposed substantially perpendicularly to the first wall, the first and second walls each having a front surface, and a rear surface that is exposed to the recess, and a plurality of spaced ribs that are coupled to the rear surfaces of both the first wall and the second wall, where the frame is substantially acoustically transparent relative to the electroacoustic transducer, the frame being a unitary molded member that has an energy absorption capacity such that for a mass of 6.8 kg impacting the frame at a speed of 24.1 km/h, the 3 ms deceleration is no more than 80 gs.

* * * * *